(12) United States Patent
Wei et al.

(10) Patent No.: US 9,229,624 B2
(45) Date of Patent: Jan. 5, 2016

(54) METHOD AND ELECTRONIC DEVICE FOR CHANGING COORDINATES OF ICONS ACCORDING TO SENSING SIGNAL

(75) Inventors: Shih-Yao Wei, Dapi Township, Yunlin County (TW); Rong-Sheng Wang, Taipei (TW); Shih-Chun Chou, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 283 days.

(21) Appl. No.: 13/324,205

(22) Filed: Dec. 13, 2011

(65) Prior Publication Data

US 2013/0120464 A1    May 16, 2013

(30) Foreign Application Priority Data

Nov. 10, 2011    (TW) .............................. 100141014 A

(51) Int. Cl.
*G09G 5/00*         (2006.01)
*G06F 3/0484*       (2013.01)

(52) U.S. Cl.
CPC .................................. *G06F 3/04842* (2013.01)

(58) Field of Classification Search
None
See application file for complete search history.

(56) References Cited

U.S. PATENT DOCUMENTS

| | | | | |
|---|---|---|---|---|
| 5,252,951 A * | 10/1993 | Tannenbaum et al. | ......... | 345/156 |
| 5,838,317 A * | 11/1998 | Bolnick et al. | ................ | 715/764 |
| 6,509,912 B1 * | 1/2003 | Moran et al. | .................. | 715/762 |
| 6,982,728 B1 * | 1/2006 | Nicolas et al. | ................ | 345/649 |
| 7,002,553 B2 * | 2/2006 | Shkolnikov | .................... | 345/169 |
| 7,688,306 B2 * | 3/2010 | Wehrenberg et al. | ......... | 345/158 |
| 7,705,830 B2 * | 4/2010 | Westerman et al. | .......... | 345/173 |
| 7,840,912 B2 * | 11/2010 | Elias et al. | ..................... | 715/863 |
| 7,956,847 B2 * | 6/2011 | Christie | ........................ | 345/173 |
| 8,191,011 B2 * | 5/2012 | Abanami et al. | .............. | 715/835 |
| 8,266,550 B1 * | 9/2012 | Cleron et al. | ................. | 715/863 |
| 8,434,023 B2 * | 4/2013 | Ge | .............................. | 715/811 |
| 8,487,882 B2 | 7/2013 | Inaba et al. | | |
| 8,610,673 B2 * | 12/2013 | Storrusten | ..................... | 345/173 |

(Continued)

FOREIGN PATENT DOCUMENTS

| | | |
|---|---|---|
| CN | 101206552 | 6/2008 |
| CN | 101213509 | 7/2008 |
| EP | 1 936 482 | 6/2008 |

OTHER PUBLICATIONS

The Complete Idiot's Guide to Windows XP, Copyright 2002 by Alpha Books, by Paul mcDedries.*

(Continued)

*Primary Examiner* — Stephen R Koziol
*Assistant Examiner* — Jason Pringle-Parker
(74) *Attorney, Agent, or Firm* — McClure, Qualey & Rodack, LLP

(57) ABSTRACT

An embodiment of the invention provides a method for changing a coordinate of an icon according to a sensing signal. The method comprises: outputting the sensing signal via a sensor according to an interactive operation of a user; displaying a plurality of the icons of an operating system via a display device, wherein each icon corresponds to a data element; when receiving the sensing signal and a trigger signal by a processor, by the processor, acquiring the icons currently shown on the display device, generating an updated coordinate of each icon according to the sensing signal output by the sensor, changing the coordinates of the icons of the operating system, and displaying the icons on the display device according to the updated coordinates.

6 Claims, 13 Drawing Sheets

(56) References Cited

U.S. PATENT DOCUMENTS

| | | | |
|---|---|---|---|
| 8,847,887 B2* | 9/2014 | Pryor | 345/158 |
| 8,856,690 B2* | 10/2014 | Reeves et al. | 715/863 |
| 2006/0055700 A1* | 3/2006 | Niles et al. | 345/473 |
| 2007/0125852 A1* | 6/2007 | Rosenberg | 235/435 |
| 2007/0156679 A1* | 7/2007 | Kretz et al. | 707/6 |
| 2009/0303204 A1* | 12/2009 | Nasiri et al. | 345/184 |
| 2010/0054086 A1* | 3/2010 | Mansmann et al. | 368/10 |
| 2010/0146444 A1 | 6/2010 | Wang et al. | |
| 2010/0283744 A1 | 11/2010 | Nordenhake et al. | |
| 2012/0162261 A1* | 6/2012 | Kim et al. | 345/647 |

OTHER PUBLICATIONS

Chinese language office action dated Sep. 6, 2015, issued in application No. CN 201110415319.7.

* cited by examiner

METHOD AND ELECTRONIC DEVICE FOR CHANGING COORDINATES OF ICONS ACCORDING TO SENSING SIGNAL

CROSS REFERENCE TO RELATED APPLICATIONS

This Application claims priority of Taiwan Patent Application No. 100141014, filed on Nov. 10, 2011, the entirety of which is incorporated by reference herein.

BACKGROUND OF THE INVENTION

1. Field of the Invention

The present invention provides a method for changing a coordinate of an icon according to a sensing signal, especially to a method for changing the coordinates of the icons and rearranging the icons according to a sensing signal generated by interactive operation of a user.

2. Description of the Related Art

Smart phones and tablet PCs have been widely used by consumers. For the purpose of comfortable screen viewing for consumers, the size of the display device has accordingly increased. However, another issue has risen. FIG. 1 shows a schematic diagram of the icons displayed on a conventional electronic device. The display device 11 of the electronic device 10 shows a plurality of the icons of an operating system, such as icons A to I. But if a user holds and operates the electronic device 10 by a single hand, the finger of this user may be approximately at the area near the icon A. If the user wants to click the icon I, it is not easy for him to move the finger to click the icon I. Although the user can use the finger of another hand to click the icon I, it is still not convenient for the user. If the user wants to move the icon or adjusts the position of the icon, the user needs to adjust the position of the icon one by one and it is time-wasting.

BRIEF SUMMARY OF THE INVENTION

An embodiment of the invention provides a method for changing a coordinate of an icon according to a sensing signal. The method comprises: outputting the sensing signal via a sensor according to an interactive operation of a user; displaying a plurality of the icons of an operating system via a display device, wherein each icon corresponds to a data element; and when receiving the sensing signal and a trigger signal by a processor, acquiring the icons currently shown on the display device, generating an updated coordinate of each icon according to the sensing signal outputted by the sensor, changing the coordinates of the icons of the operating system, and displaying the icons on the display device according to the updated coordinates, by the processor.

Another embodiment of the invention provides an electronic device capable of changing a coordinate of an icon according to a sensing signal. The device comprises a sensor, a display device and a processor. The sensor outputs a sensing signal according to an interactive operation of a user. The display device displays a plurality of the icons of an operating system, wherein each icon corresponds to a data element. The processor is electrically connected to the sensor and the display device. When the processor receives the sensing signal and a trigger signal, the processor acquires the icons currently shown on the display device, generates an updated coordinate of each icon according to the sensing signal outputted by the sensor, and changes the coordinates of the icons of the operating system, wherein the icons are then displayed on the display device according to the updated coordinates.

Another embodiment of the invention provides an electronic device capable of changing a coordinate of an icon according to a sensing signal. The device comprises an icon coordinate transform module, a personalized module, a sensor and a processor. The icon coordinate transform module receives an initial icon coordinate data. The personalized module acquires a plurality of parameters corresponding to a plurality of the icons of the initial icon coordinate data to generate a weight value of each icon according to the parameters. The sensor receives and transmits a sensing signal to the personalized module. The processor is electrically connected to the sensor and the personalized module. When the processor receives the sensing signal and a trigger signal, the icon coordinate transform module rearranges the icons according to the weight value of each icon.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
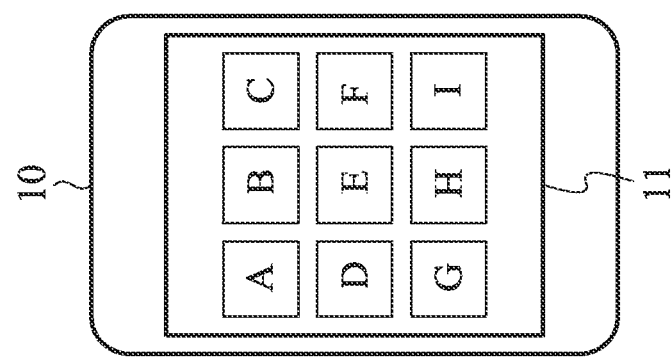
FIG. 1 shows a schematic diagram of the icons displayed on a conventional electronic device.
Figure 2:
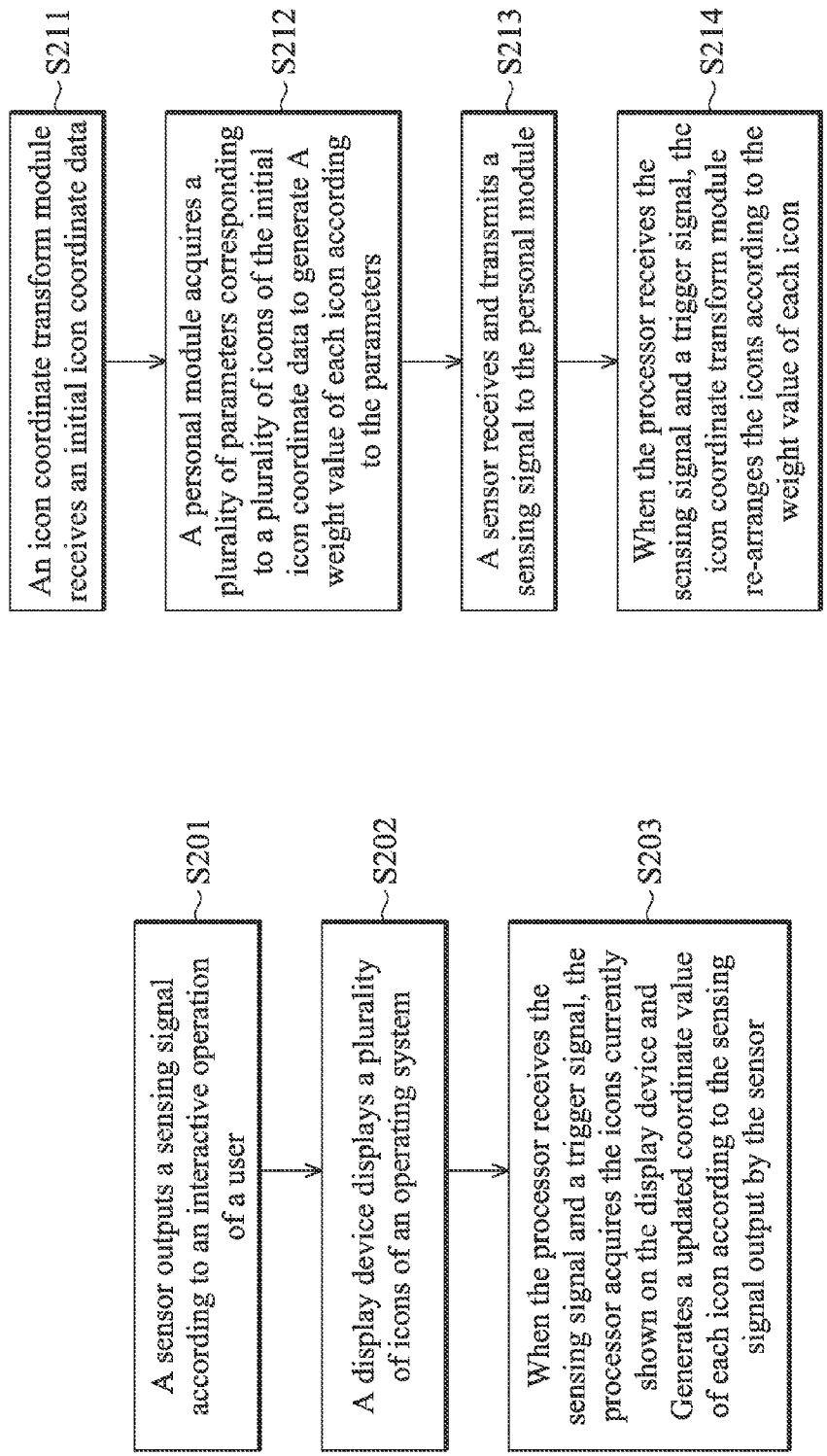
FIG. 2A is a flowchart of an embodiment of a method for changing a coordinate of an icon based on a sensing signal according to the invention.
FIG. 2B is a flowchart of another embodiment of a method for changing a coordinate of an icon based on a sensing signal according to the invention.

FIG. 2A is a flowchart of an embodiment of a method for changing a coordinate of an icon based on a sensing signal according to the invention. In step S201, a sensor outputs a sensing signal according to an interactive operation of a user. The sensor may be a touch panel, a linear accelerometer, a gyroscope or a microphone. In step S202, an operating system shows a plurality of the icons on a display device of an electronic device, wherein each icon corresponds to a data element. The data element is used to execute an instruction, to activate or execute an application program, to open a folder, to open a file or to link to a website or a webspace storing a requested file by a URL (Uniform Resource Locator). When a processor of the electronic device receives the sensing signal and a trigger signal, the processor acquires a plurality of the icons that are currently shown on the display device and generates an updated coordinate of each icon according to the sensing signal. The processor then modifies the coordinate of each icon according to the updated coordinate and shows the icons with the updated coordinates on the display device of the electronic device. The trigger signal may be a keystroke signal, a start signal of an application program or any kind of sensing signal. The trigger signal may be the same as the described sensing signal or other sensing signals from different sensors. Furthermore, the sensing signal and the trigger signal may be generated at the same time. For example, when the user presses a specific key and shakes the electronic device, the shaking of the electronic device is used to generate a sensing signal and the keystroke is used to generate the trigger signal. In another embodiment, the sensing signal is generated before the trigger signal. For example, when the user turns the electronic device, a gyroscope embedded in the electronic device first generates a sensing signal to activate an application program and the activation of the application program is the trigger signal. The processor then executes an icon rearrangement function to update and modify the coordinates of the icons and displays the icons with the updated coordinates. In another embodiment, the trigger signal is determined according to a touch duration when the user presses a physical or virtual key, and the sensing signal is generated by detecting a tilt status of the electronic by the gyroscope. When detecting the sensing signal and the trigger signal, the processor executes the icon rearrangement function.

Furthermore, the processor receives and analyzes the sensing signals to determine whether the sensing signals match to a predetermined condition. When the sensing signals conform to the predetermined condition, the trigger signal is issued. In other embodiments, the icons with the updated coordinates are shown in a predetermined icon arrangement, i.e., the updated coordinates are generated according to the determined icon arrangement. For example, the icons are arranged and displayed in a specific area, such as a left area or a bottom of the screen, or the icons are arranged at the surrounding areas of the screen, or the icons are flipped up, down, right or left along a virtual axis.

FIG. 2B is a flowchart of another embodiment of a method for changing a coordinate of an icon based on a sensing signal according to the invention. In step S211, an icon coordinate transform module receives an initial icon coordinate data, wherein the initial icon coordinate data comprises display pictures, names and coordinates of the icons currently shown on the display device of an electronic device. The initial icon coordinate data may be provided by an operating system of the electronic device or acquired via an application program. The application program captures a current frame of the display device of the electronic device and analyzes the frame to acquire the initial icon coordinate data. In step S212, a personalized module acquires a plurality of parameters corresponding to the icons included in the initial icon coordinate data and generates a weight value of each icon according to the parameters. The operating system gives an initial weight value of each icon and the weight values are adjusted according to user usage and the parameters. The parameters comprise a total number of times that the icon has been clicked, a click rate of the icon, a created date of the icon, a most recent date at which an application program corresponding to the icon has been executed, a total execution time of the application program or a download time of the application program. In other words, the personal weight values are generated after the initial weight values are calibrated according to user usage. The operating system may collect personalized data of users of each icon or the personalized data of each icon is set by the user, and the weight values are generated according to the personalized data. In step S213, sensor receives and transmits a sensing signal to the personalized module. In step S214, when a processor of the electronic device receives the sensing signal and a trigger signal, the icon coordinate transform module rearranges the icons according to the weight value of each icon. The processor further detects whether the sensing signal and the trigger signal have been received. In this embodiment, only when the electronic device receives the predetermined sensing signal and trigger signal, will the icon rearrangement method of the embodiment be executed. If the user is using other application programs and the electronic device receives the predetermined sensing signal and trigger signal, the icon rearrangement method of the embodiment may be not executed. In another embodiment, the icon coordinate transform module and the personalized module are implemented by at least one application program. When the processor of the electronic device receives the predetermined sensing signal and trigger signal but the application program corresponding to the icon coordinate transform module and the personalized module is not activated, the processor first activates the application program and then executes the icon rearrangement of the embodiment of the invention.

In other embodiments, different sensing signals correspond to different icon arrangements. For example, an electronic device has a plurality of kinds of sensors, wherein each sensing signal of each sensor corresponds to an icon arrangement, and the icon arrangements are stored in a storage device. The electronic device outputs corresponding sensing signals according to interactive operation of a user. When the processor receives the trigger signal and the sensing signal, the processor first determines a corresponding icon arrangement corresponding to the received sensing signal and then generates corresponding updated coordinates of each icon. For example, the electronic device comprises a first sensor outputting a first sensing signal and a second sensor outputting a second sensing signal. The storage device stores a first icon arrangement corresponding to the first sensing signal and a second icon arrangement corresponding to the second sensing signal. The first icon arrangement arranges all icons at a right side of the screen and the second icon arrangement flips the icons up or down along a central vertical axis in the display device of the electronic device. When the processor receives the first sensing signal or the second sensing signal, the processor acquires the corresponding icon arrangement from the storage device and generates the updated coordinates of the icons according to the selected icon arrangement.

In other embodiments, the sensing signal may be only one, but the trigger signal may be one of a plurality of kinds of trigger signal, wherein different trigger signals correspond to different icon arrangements and the icon arrangements are stored in a storage device. When receiving the trigger signal, the trigger signal is analyzed to determine which icon arrangement has been adopted. Since the trigger signal may have different modes, kinds or types and may be generated by different sensors or by the electronic device, the processor first analyzes the trigger signal to determine a corresponding icon arrangement according to the mode or type of the trigger signal. For example, the trigger signal may be a vibration, a shake or a rotation of the smart phone or an activation of an application program, and the corresponding icon arrangement may be a falling mode. When the electronic device receives the trigger signal, the icons currently shown on the display device of the electronic device free fall to the bottom of the screen. In another embodiment, the electronic device determines whether the display device has been touched and icons are moved to the surrounding area of the touch area when the electronic device detects that the display device has been touched. In another embodiment, the trigger signal is a first moving track of the user on the touch panel, and the first moving track is defined as an axis. Then, the icon arrangement for the currently shown icons is then determined according to the second moving track.

Figure 3:
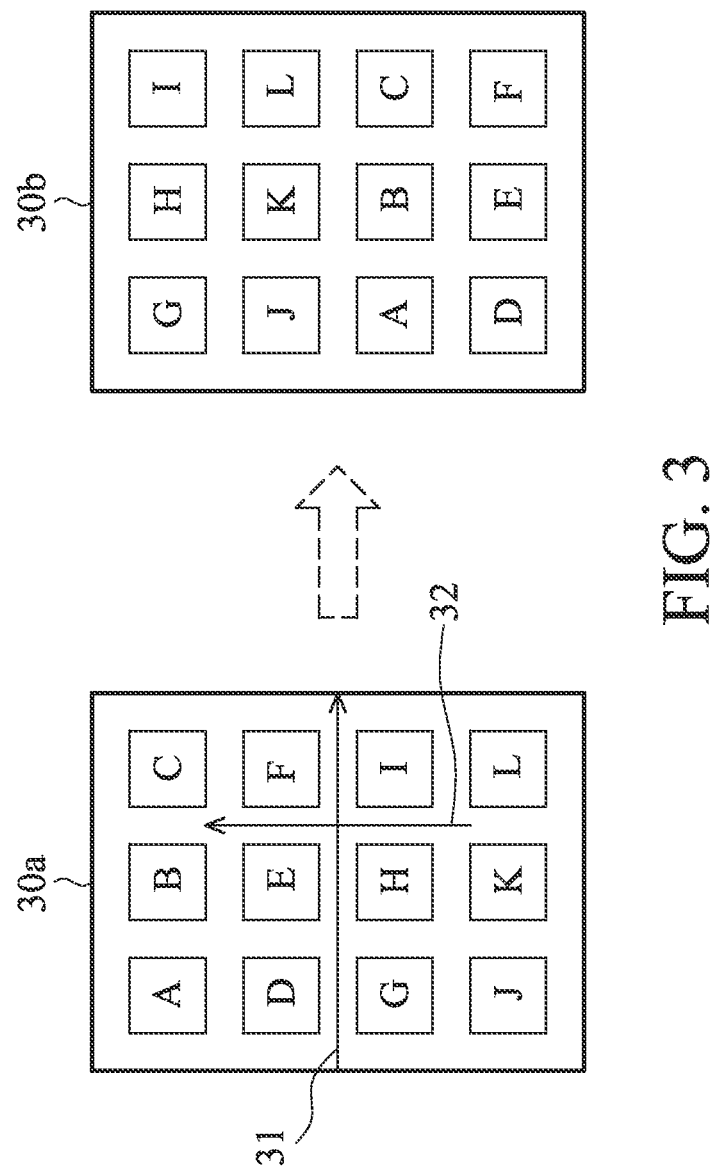
FIG. 3 is a schematic diagram of an icon rearrangement according to an embodiment of the invention.

Please refer to FIG. 3. FIG. 3 is a schematic diagram of an icon rearrangement according to an embodiment of the invention. In FIG. 3, the desktop 30a is a schematic diagram showing an initial icon arrangement and the desktop 30b is a schematic diagram showing icons after being rearranged. In FIG. 3, the first moving track, such as the track 31, is a moving track leveled to the right, and the second moving track, such as the track 32, is a moving track leveled up. The processor can first divided the icons into two icon groups according to the moving track 31, and then exchange the positions of the two icon groups. The result of the icon rearrangement is shown as the desktop 30b.

Figure 4:
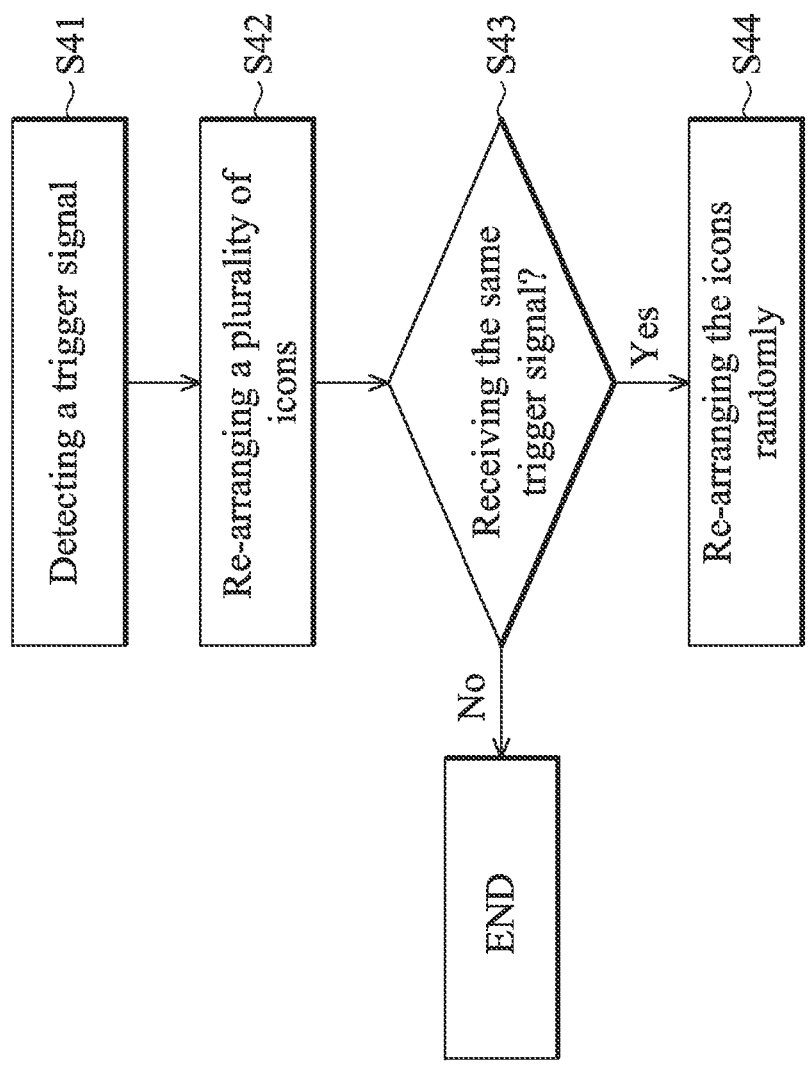
FIG. 4 is a flowchart of a method for arranging icons according to another embodiment of the invention.

FIG. 4 is a flowchart of a method for arranging icons according to another embodiment of the invention. The method can be executed by an application or an operating system of an electronic device. The following paragraph illustrates the icon arrangement with an application executed by a processor of the electronic device. In step S41, the icon arrangement program detects whether a trigger signal has been received. The trigger signal may be an interrupt signal to inform the icon arrangement program. The trigger signal may be generated by a touch panel, a G-sensor, a gyroscope or a keystroke. In another embodiment, a first application program receives sensing data from the touch panel, the gyroscope, a G-sensor or a keypad and determines whether the received sensing data conforms to a predetermined condition to generate the trigger signal. For example, if a moving track of the user is from the upper right to the lower left or from the upper right to the lower left on the touch screen, the first application program outputs the trigger signal. In another embodiment, the user presets a trigger condition to generate the trigger, wherein the trigger condition is to shake the smart phone three successive times and a shake angle of each shake is larger than a predetermined angle. When the application program detects the trigger condition, the icon arrangement process is activated and the icons shown on the screen of the electronic device are rearranged. When the first application program receives and analyzes the sensing data and finds that the interaction operations of the user match the trigger condition, the first application program outputs the trigger signal.

In step S42, the icon arrangement program rearranges the icons currently shown on a display device of the electronic device. The icon arrangement program first determines a rearrangement mode to rearrange the icons according to the trigger or the data transmitted by the first application data. Then, the icon arrangement program acquires personalized data to generate a weight value of each icon and rearranges the icons according to the weight values of the icons and the rearrangement mode. By this way, a first icon that is the most frequently clicked by the user is placed at the area where the user can easily click and make a selection. For example, when a right-handed user uses his left hand to hold a smart phone or uses both hands to hold a tablet PC, the area that the thumb can easily click is the lower left corner or the lower right corner of the touch panel. Thus, the first icon will be placed at or approximate to the lower left corner or the lower right corner of the touch panel after the icon rearrangement.

In the step S43, the icon arrangement program determines whether the same trigger signal has been received within a predetermined period or the first application determines whether two the same successive trigger signals have been generated within the predetermined period. If the described condition occurs, it means that the user is not satisfied with the icon rearrangement of the step S42 and the step S44 is then executed. In step S44, the icon arrangement program is rearranged randomly. In this embodiment, if the user is still not satisfied with the icon rearrangement, the user can use the smart phone to generate the same trigger signal repeatedly and the icon arrangement method is repeated in steps S43 and S44 until the user clicks any icon. The icon arrangement program records information about icons clicked by the user after the icon rearrangement, and estimates a weight value of each icon accordingly. As previously described, the personalized data may comprise a total number of times that the icon has been clicked, a click rate of the icon, a total execution time of the application program and others. In this embodiment, the coordinate of each icon may be included in the personalized data and is a reference for generating the corresponding weight value.

Figure 5:
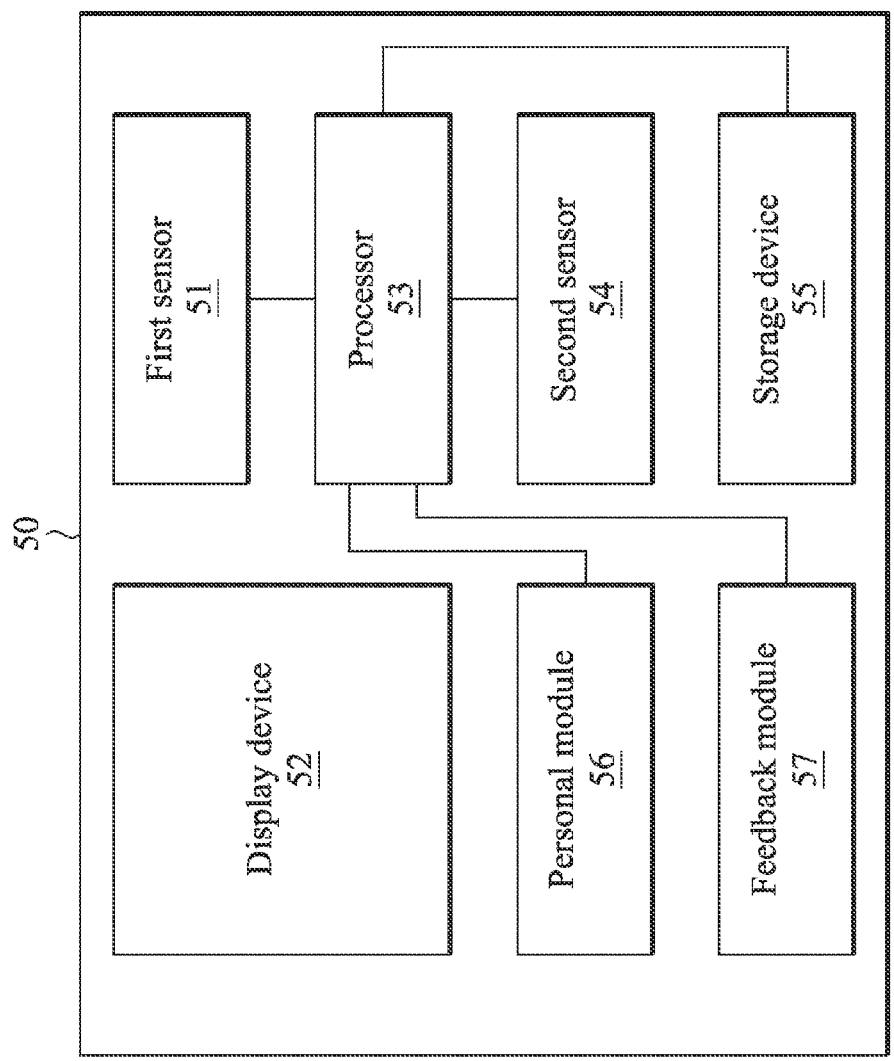
FIG. 5 is a schematic diagram of an embodiment of an electronic device that can rearrange icons based on a sensing signal according to the invention.

FIG. 5 is a schematic diagram of an embodiment of an electronic device that can rearrange icons based on a sensing signal according to the invention. The electronic device 50 comprises a first sensor 51, a display 52, a processor 53, a second sensor 54, a storage device 55, a personalized module 56 and a feedback module 57. The first sensor 51 outputs a first sensing signal according to an interactive operation of the user, wherein the first sensor 51 may be a touch panel, a linear accelerometer or a gyroscope. The display 52 shows a plurality of the icons of an operating system, wherein each icon corresponds to a data element and the data element is used to execute an instruction, to activate an application program, to open a folder, to open a file or to open a URL (Uniform Resource Locator) linking to a website or a webspace storing a requested file. The processor 53 is electrically connected to the first sensor 51 and the display 52. When the processor 53 receives the first sensing signal and a trigger signal, the processor 53 acquires the icons currently shown on the display 52 and generates an updated coordinate of each acquired icon. The processor 53 then modifies the coordinates of the icons of the operating system according to the updated coordinates and displays the icons with the updated coordinates on the display 52. Each icon has a weight value and the processor 53 generates the updated coordinate of each icon according to the first sensing signal and the corresponding weight value.

In another embodiment, the electronic device 50 further comprises at least one second sensor 54 that outputs a second sensing signal according to other interactive operations of the user. The storage device 55 stores an icon arrangement mode corresponding to the first sensing signal and each second sensing signal, such as a first icon arrangement and a plurality of second icon arrangements. When the processor 53 receives the trigger signal and one of the first sensing signal and the second sensing signal, the processor 53 acquires a corresponding icon arrangement according to the received sensing signal to generate the updated coordinate of each icon. The personalized module 56 is coupled to the processor and receives a personalized data of each icon, wherein the personalized data comprises an icon name, the coordinate of the icon, a total number of times that the icon has been clicked, a click rate of the icon, a created date of the icon, a most recent date at which an application program corresponding to the icon has been executed, a total execution time of the application program, a download time of the application program, a kind of the application program, a file corresponding to the icon or a ranking or rating of the application program corresponding to the icon. The feedback module 57 is coupled to the processor 53 and transmits at least one interactive operation after the icon rearrangement to the personalized module 56 to calibrate the weight values of the icons.

Figure 6:
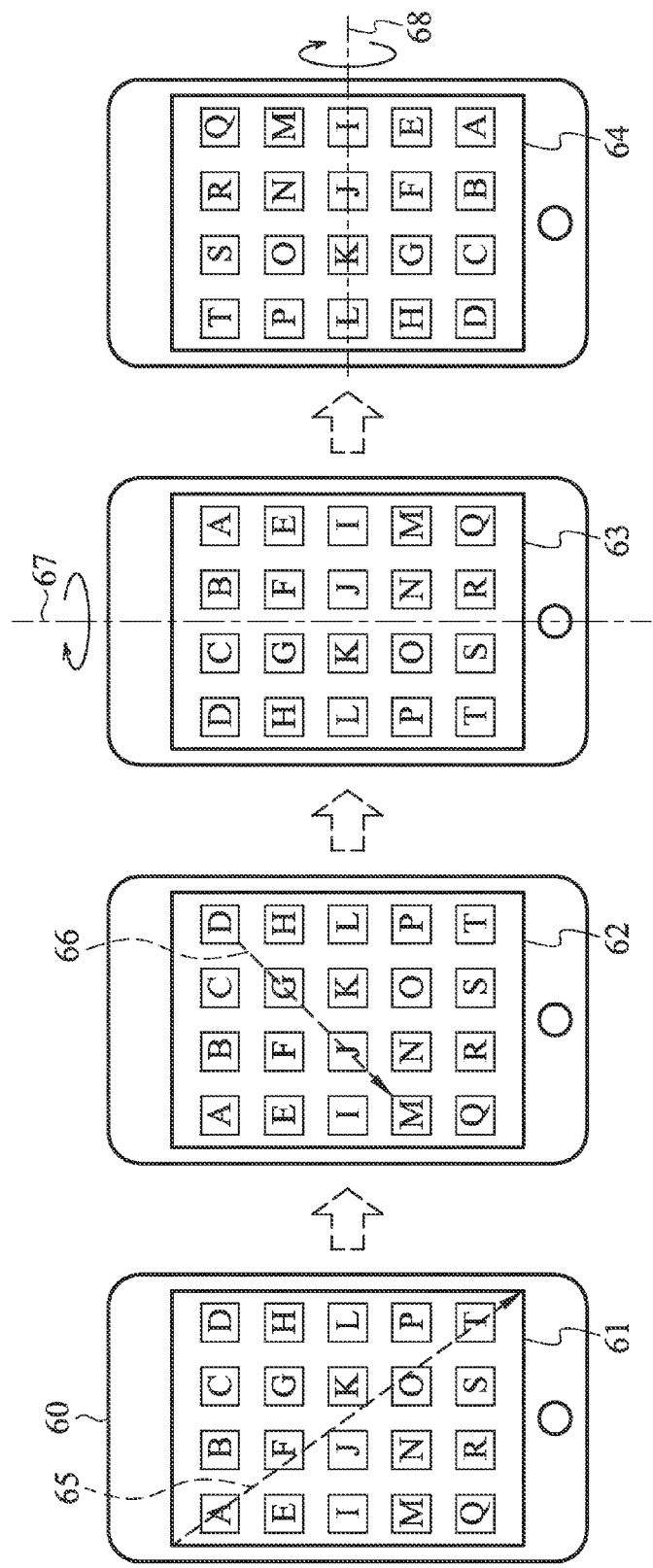
FIG. 6 shows an icon rearrangement procedure modifying coordinates of the icons in accordance with a moving track on the touch panel according to an embodiment of the invention.

FIG. 6 shows an icon rearrangement procedure modifying coordinates of the icons in accordance with a moving track on the touch panel according to an embodiment of the invention. Although the embodiment is illustrated with a smart phone 60, the operation can be applied to a tablet PC. The desktops 61 to 64 show the icon arrangements at different times. In the desktop 61, icons A to T are arranged in a predetermined arrangement and shown on a display device of the smart phone 60. When the smart phone 60 detects a first moving track 65, i.e. a sensing signal, a trigger signal generator of the smart phone 60 is enabled. The trigger signal generator determines to transmit a trigger signal to the smart phone 60 or not according to a next interactive operation of the user. When a processor of the smart phone 60 receives the trigger signal, the processor executes the icon rearrangement operation. In the desktop 62, the smart phone 60 detects a second moving track 66 and the trigger signal generator determines that the first moving track 65 and the second moving track 66 match one of the trigger signal generation conditions, the trigger signal is generated and transmitted to an icon arrangement module of the smart phone 60. In this embodiment, a two step determination is applied to determine whether the icon rearrangement process is executed by the processor or not. The first step determines whether the icon rearrangement module needs to be activated. When the first moving track 65 conforms to a predetermined condition or rule, the icon rearrangement module is activated. It is noted that the icon arrangement process or method will not immediately be executed when the icon rearrangement module is activated. Only when a detected sensing signal conforms to other predetermined condition or rule after the icon rearrangement module is activated, the icon arrangement process or method is then executed. In this embodiment, when the second moving track 66 conforms to the predetermined rule, the icon rearrangement module executes the icon arrangement process or method. In this embodiment, the first moving track 65 is regarded as a virtual axis and the second moving track 66 represents that the icons flip along the virtual axis from the upper right side to the lower left side. If the second moving track 66 is a downward moving track, the icons flip from up to down along a horizontal virtual axis of the desktop 62 or the virtual axis generated in accordance with the first moving track 65.

In this embodiment, the icons A to T of the desktop 62 are moved twice to match the determined icon arrangement. The icons A to T first flip along the virtual axis 67 in a clockwise direction or a counterclockwise direction, and the result is shown as the desktop 63. Then, the icons A to T shown on the desktop 63 flip along the virtual axis 68 in a clockwise direction or a counterclockwise direction, and the result is shown as the desktop 64. The arrangement of the icons A to T shown on the desktop 64 is the determined icon arrangement. It is noted that the user may not see the icon arrangement shown on the desktop 63, and only sees the result of the icon rearrangement, such as the icon arrangement shown on the desktop 64. In another embodiment, when the icons A to T are flipped, the moving of the icons A to T is shown by a motion picture or animation.

Figure 7:
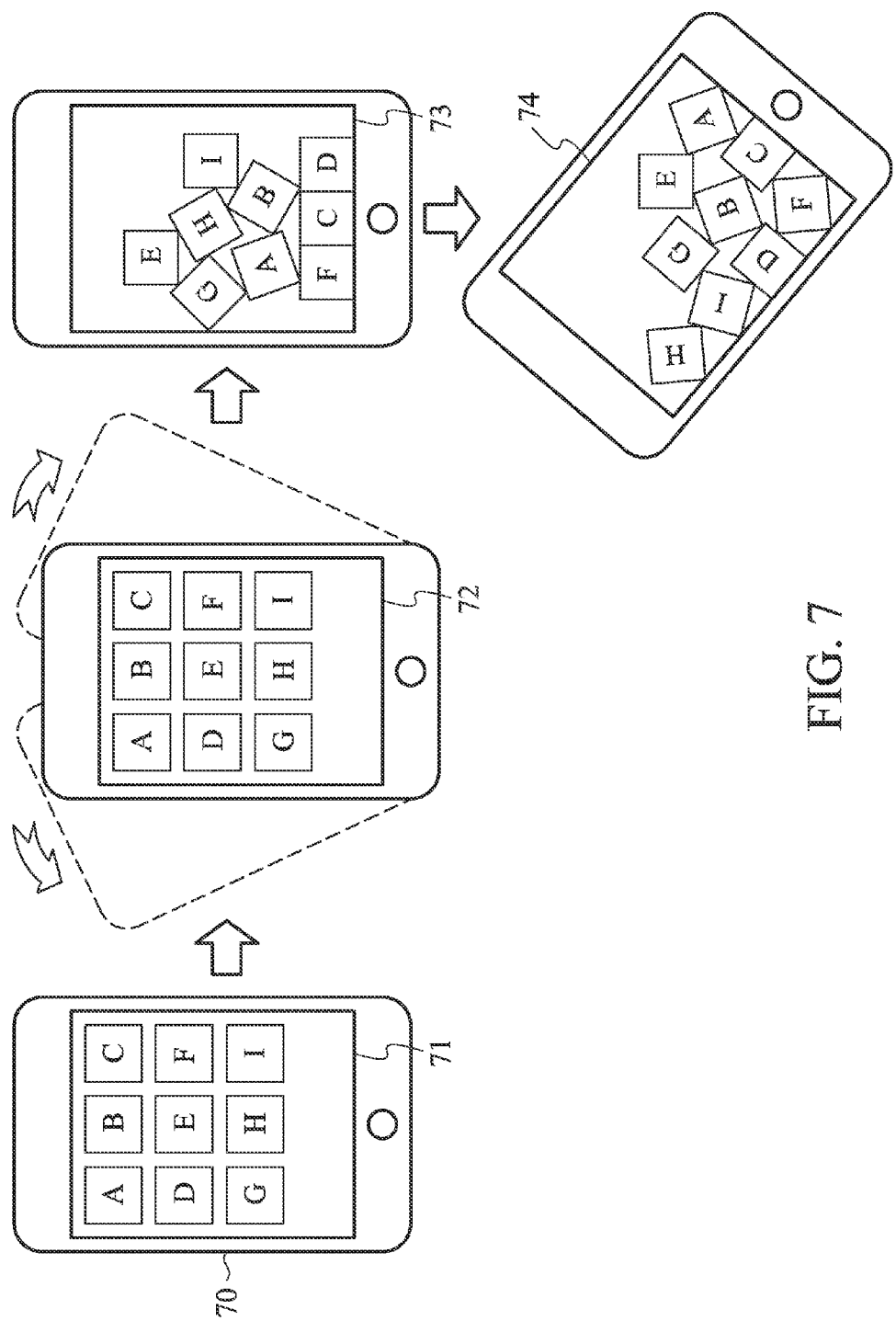
FIG. 7 shows another embodiment of an icon rearrangement operation in accordance with the invention.

FIG. 7 shows another embodiment of an icon rearrangement operation in accordance with the invention. The icon rearrangement operation shown in FIG. 7 is executed or activated according to a shake or rotation of the smart phone. Although the embodiment is illustrated with a smart phone 70, the operation can be applied to a tablet PC. The desktops 71 to 74 show the icon arrangements at different times. In the desktop 71, icons A to T are arranged in a predetermined arrangement and shown on a display device of the smart phone 70. When detecting that the smart phone is continuously being shaken in a horizontal direction and a velocity or an angular velocity is larger than a predetermined value, a sensing signal and a trigger signal is detected and received by the smart phone 70. Then, the icons A to T shown on the desktop 72 free fall towards to the bottom of the desktop, such as that shown in the desktop 73. In this embodiment, the larger weight value the icon has, the faster the icon falls. In other words, the icon with larger weight value is closer to the bottom of the desktop 73. In this embodiment, the icon F has the largest weight value and the icon E has the smallest weight value. When the smart phone 70 is tilted, the positions of the icons A to I will be adaptively changed, such as that shown as the desktop 74. The change or moving between the desktop 73 and 74 can be shown by a motion picture or animation.

Figure 8:
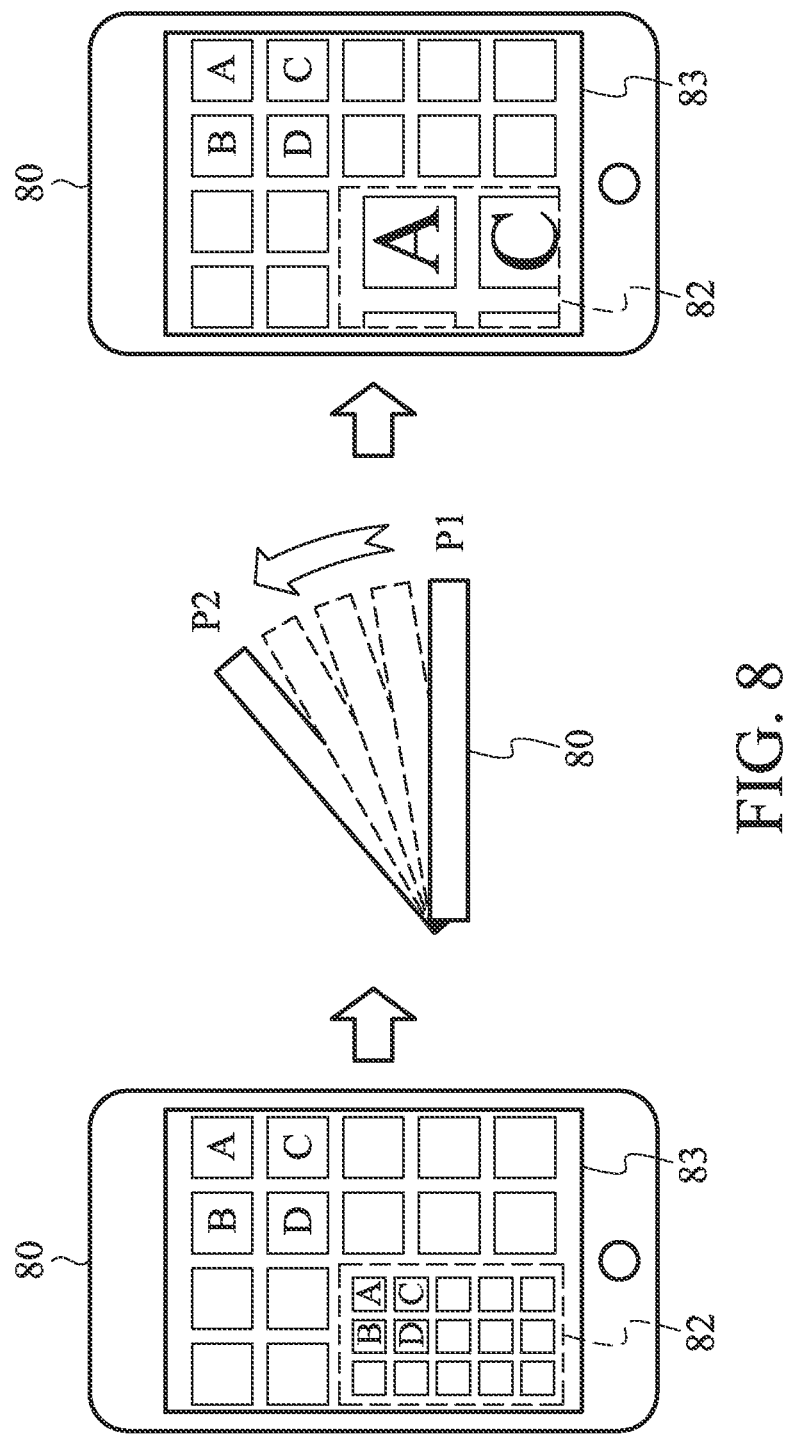
FIG. 8 shows an icon rearrangement operation in accordance with another embodiment of the invention.

FIG. 8 shows an icon rearrangement operation in accordance with another embodiment of the invention. In FIG. 8, the sensing signal is determined according to a touch duration when the user touches a predetermined area of the touch panel. Although the embodiment is illustrated with a smart phone 80, the operation can be applied to a tablet PC. The desktops 81 and 83 show the icon arrangements at different times. When the smart phone 80 detects that the user has touched a specific area on the touch panel and the touch duration has exceeded a predetermined time period, a sensing signal is detected and a trigger signal is soon activated accordingly. The trigger signal activates an application program to create a window 82 on a display device of the smart phone 80. The window 80 contains all the icons shown on the desktop 81. In other words, an initial content of the window 80 is the icons currently shown on the desktop 81. When a user operates the icons in the window 82, such as clicks, selects or moves, the responses from the smart phone 80 are the same as the responses generated when the user operates corresponding icons in the desktop 81. It is noted that the relative positions of the icons shown in the window 82 are the same as the relative position of the corresponding icons shown in the desktop 81. The display pictures of the icons shown in the window 82 are the minified display pictures of the icons shown in the desktop 81. In this embodiment, the window 82 shows an icon rearrangement of the icons of the desktop 81. Furthermore, the user's moving track in the windows 82 may move the icons shown in the window 82. The windows 82 may show a part of the desktop 81, and the content of the window 82 can be changed according to the moving track of the user in the window 82. In other words, a vertical scrolling bar and a horizontal scrolling bar are created for the window 82 but not shown in the window 82. The moving track of a user's finger is transformed to one vertical value and one horizontal value, and the displayed frame of the window 82 is scrolled according to the vertical value and the horizontal value. In another embodiment, the processor detects the sensing signals from the line accelerator or the gyroscope and moves or rearranges icons shown in the window 82 according to a tilt direction and a tilt angle generated by the line accelerator or the gyroscope.

Moreover, the icons shown in the window 82 can be zoomed in to or zoomed out off according to other sensing signals, such as a tilt angle of the smart phone 80. For example, when the position of the smart phone 80 is changed from the position P1 to the position P2, the display size of the icons shown in the window 82 is enlarged, such that as shown in the desktop 83. The icon A is farthest from the lower left corner of the display device of the smart phone 80 and not easily clicked by a user's finger or thumb. By the window 82, the icon A can be shown in the lower left side of the smart phone 80 and the user can easily click or select the icon A. In another embodiment, when the window 82 is touched and the smart phone 80 is leveled up or leveled down, the display size of the icon shown in the window 82 is zoomed in to or zoomed out off. In this embodiment, the interactive operations of the user are regarded as a feedback signal, and the smart phone 80 analyzes user usage according to the feedback signal to calibrate a magnification corresponding to the moving velocity or the tilt status of the smart phone 80 and the moving velocity of the icons shown in the window 82.

Figure 9:
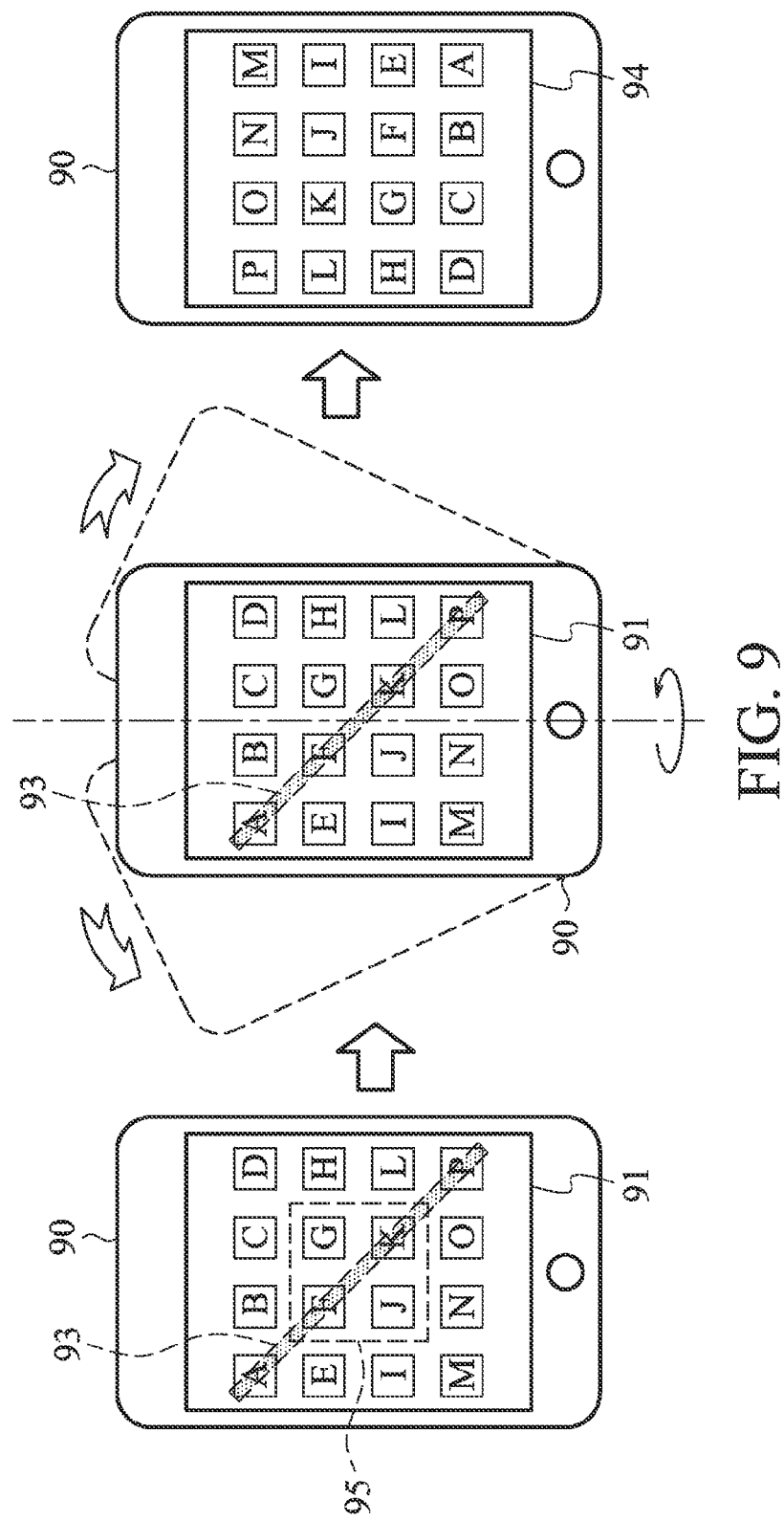
FIG. 9 shows another icon arrangement operation by detecting a moving track on a touch panel according to the invention.

FIG. 9 shows another icon arrangement operation by detecting a moving track on a touch panel according to the invention. Although the embodiment is illustrated with a smart phone 90, the operation can be applied to a tablet PC. The icon arrangement is activated when receiving a trigger first and at least one sensing signal. The desktops 91 and 94 show the icon arrangements at different times. In this embodiment, the trigger signal is a first moving track 93. When the smart phone 90 detects the first moving track 93, an application program is activated. In another embodiment, the user defines the trigger signal via the application program, wherein the trigger signal is generated according to at least one gesture, at least one moving track or a combination thereof. In this embodiment, the trigger signal is a one-finger moving track from the upper right corner to the lower left corner of the screen of the smart phone 90. In another embodiment, the user or an operating system of the smart phone 90 defines a specific area, such as the central area 95. When detecting a moving track passing through the specific area and a length of the moving track conforms to a predetermined range, the trigger signal is issued to activate the application program. When the trigger signal is issued, the smart phone 90 vibrates to inform the user that the application program has been activated. In another embodiment, the user or an operating system of the smart phone 90 defines a specific area, such as the central area 95. When detecting that a moving track is passing through the specific area and a user also vibrates or shakes the smart phone 90, the trigger signal is issued to activate the application program.

After the application program is activated, the first moving track 93 is configured as a rotation axis. The icons are then rearranged according to a sensing signal generated by moving or rotating the smart phone 90. The icon rearrangement is shown as the desktop 94. The icon arrangements of desktops 91 and 94 show that the icons are flipped along the first moving track 93 according to a sensing signal generated when the smart phone is moved or rotated. In another embodiment, the user's moving track on the touch screen is regarded as a trigger signal, the shake, vibration or rotation of the smart phone 90 is regarded as a sensing signal, and the icons are rearranged according to the trigger signal and the sensing signal. In other words, the moving track on the touch panel is regarded as a trigger signal to activate the icon arrangement module or program, but the icons are not rearranged immediately. When the smart phone 90 detects a sensing signal generated by vibrating or shaking the smart phone 90 within a predetermined time period, the icons are then rearranged. In this embodiment, the user can set or define the sensing signal that will activate the icon rearrangement process via an icon rearrangement program or module. The sensing signal may be a combination of successive user interactive operations or successive signals from at least one sensor. The sensing signal may relate to a threshold of a rotation angle, a tilt angle or a moving acceleration of the smart phone 90. In other words, for example, if the tilt angle of the smart phone 90 does not exceed a predetermined angle, the status of the tilted smart phone 90 will not cause the sensing signal to be generated.

Figure 10:
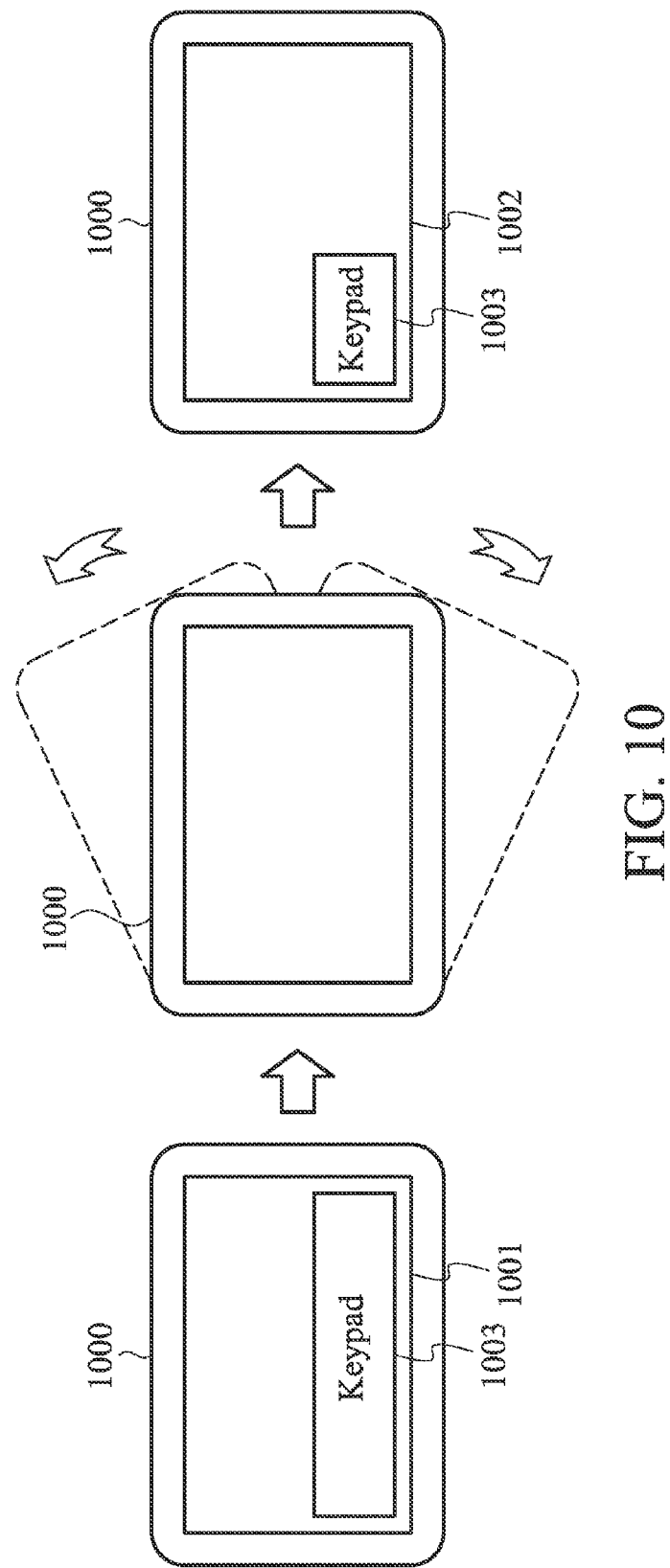
FIG. 10 is a schematic diagram of an operation for minifying a virtual keypad of an electronic device according to an embodiment of the invention.

FIG. 10 is a schematic diagram of an operation for minifying a virtual keypad of an electronic device according to an embodiment of the invention. The embodiment is illustrated with a virtual keypad but the invention is not limited thereto. The operation can be applied to any menu, window, interface or OSD (on screen display) shown on a display device of an electronic device. Although the embodiment is illustrated with a smart phone 1000, the operation can be applied to a tablet PC. The desktops 1001 and 1002 show the icon arrangements at different times. In the desktop 1001, the virtual keypad 1003 is displayed with a larger size for the purpose of user convenience. When the user shakes or rotates the smart phone 1000, an icon rearrangement process is activated. The virtual keypad 1003 is minified and placed in the corner of the screen. According to the described operation, the user of the smart phone 1000 can easily use the virtual keypad 1003 and the keypad 1003 can be minified and placed in the corner of the screen when the user does not use it. This can allow the keypad 1003 to not occupy the view area of the screen.

Figure 11:
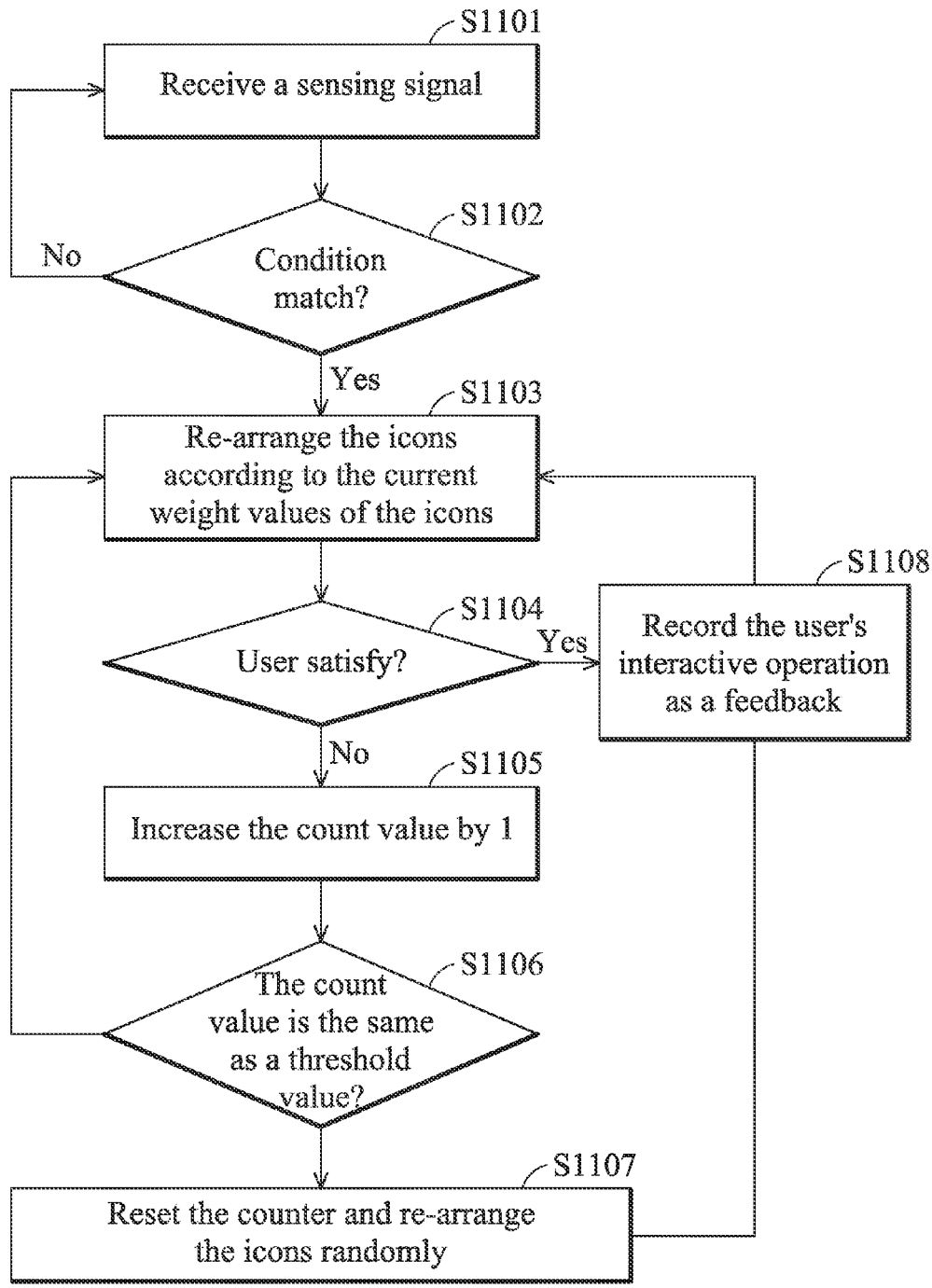
FIG. 11 is a flowchart of an icon arrangement method according to an embodiment of the invention.

FIG. 11 is a flowchart of an icon arrangement method according to an embodiment of the invention. In step S1101, a processor or an application program of the electronic device receives sensing data from a sensor. The sensor 1203 may be a touch panel, a linear accelerometer, a gyroscope or a microphone. In step S1102, the processor or the application program analyzes the sensing data to determine whether an interactive operation of the user conforms a predetermined condition to generate a trigger signal. If not, the process returns to step S1101. If yes, the step S1103 is executed to rearrange icons according to current weight values of the icons. In step S1104, the processor or the application program determines whether the icon arrangement of S1103 satisfies the user's need according to interactive operations of the user after the step S1103. If yes, the step S1108 is executed. The user's interactive operations are regarded as a user's feedback and fed back to the processor or the application. The processor or the application modifies the weight value of each icon according to the user's feedback. If the icon arrangement of S1103 does not satisfy the user's need, the step S1105 is executed. The processor or the application program increases a count value of a counter by 1 and determines whether the count value is equal to a threshold value. If yes, the step S1107 is executed. The count value is reset to 0 and the icons currently shown are rearranged randomly or by a random mode. If the count value is smaller than the threshold value, the process returns to the step S1103, and the processor adjusts the weight value of each icon according to a subsequent interaction operation of the user.

Figure 12:
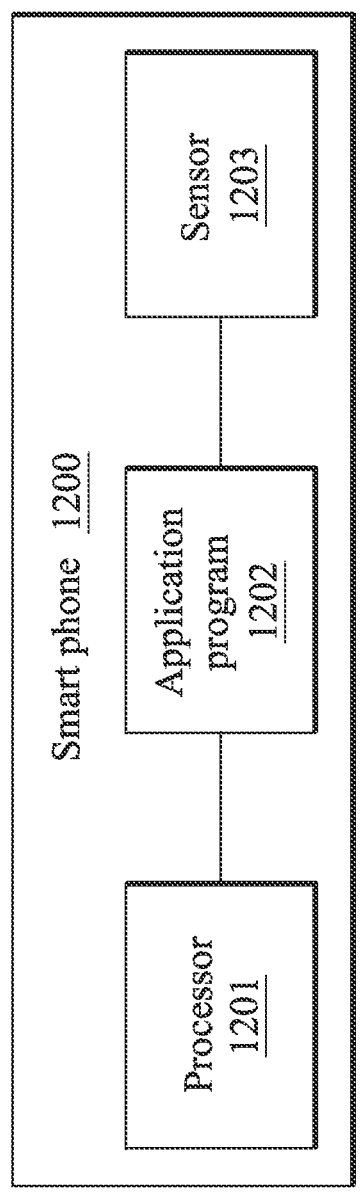
FIG. 12 is a schematic of a smart phone according to an embodiment of the invention.

FIG. 12 is a schematic of a smart phone according to an embodiment of the invention. The smart phone 1200 comprises a processor 1201, an application program 1202 and a sensor 1203. The sensor 1203 may be a touch panel, a linear accelerometer or a gyroscope. The application program 1202 detects whether a trigger signal has been received, wherein the trigger signal may be in the form of an interrupt signal to inform the application program 1202. The sensing signal may be generated by a touch panel, a gyroscope, a G-sensor or keypad. In another embodiment, the application program 1202 receives and analyzes the sensing data transmitted by the sensor 1203 and determines whether the sensing data conforms to a predetermined condition. When the sensing data conforms to a predetermined condition, the trigger signal is generated and issued. When the processor 1201 receives the trigger signal or the predetermined condition is satisfied, the application program 1202 rearranges the icons currently shown on the display device of the smart phone 1200. The application program 1202 selects an icon arrangement mode according to the trigger signal or the predetermined condition. Then, the application program 1202 acquires personalized data and generates a weight value of each icon according to the personalized data. The application program 1202 rearranges the icons according to the arrangement mode and the weight value. According to the described icon arrangement, a first icon that is most frequently selected by the user will be placed at the area where the user can easily click and make a selection.

Figure 13:
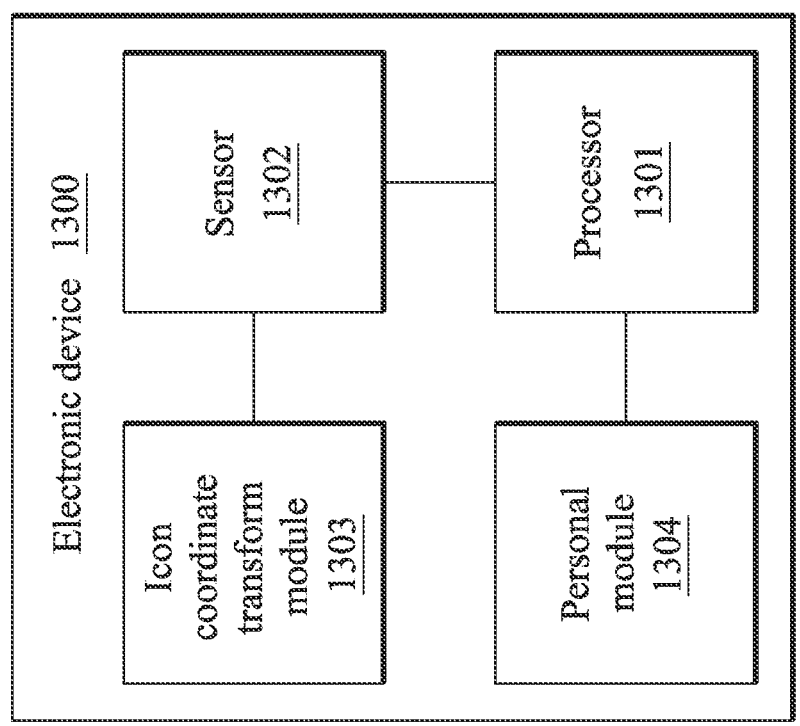
FIG. 13 is a schematic diagram of an electronic device according to an embodiment of the invention.

FIG. 13 is a schematic diagram of an electronic device according to an embodiment of the invention. The electronic device 1300 comprises an icon coordinate transform module 1303, a personalized module 1304, a sensor 1302 and a processor 1301. The icon coordinate transform module 1303 receives an initial icon coordinate data that records coordinate data of the icons currently shown by an operating system. The personalized module 1304 acquires a plurality of parameters corresponding to the icons of the initial icon coordinate data to generate a weight value of each icon according to the parameters. The sensor 1302 detects an interactive operation of the user and outputs a corresponding sensing signal. The sensor 1302 further transmits the sensing signal to the personalized module 1304. The processor 1301 is electrically connected to the sensor 1302 and the personalized module 1304. When the processor 1301 receives the sensing signal and a trigger signal, the icon coordinate transform module 1303 rearranges the icons according to the weight value of each icon.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for changing coordinates of icons shown on a display device of a portable device according to a sensing signal, the method comprising:
    displaying a plurality of the icons of an operating system via the display device, wherein each icon corresponds to a data element;
    detecting a first moving track on the display;
    enabling a trigger signal generator when receiving the first moving track;
    determining whether the first moving track conforms to a predetermined condition;
    activating an icon arrangement module when the first moving track conforms to a predetermined condition;
    detecting a second moving track on the display;
    generating a trigger signal by the trigger signal generator when the first moving track and the second moving track matches one of the trigger signal generation conditions; and
    when the icon arrangement module receives the trigger signal, the icons are rearranged according to the first moving track and the second moving track, and an icon rearranged result is displayed on the display,
    wherein the first moving track is defined by a user gesture and defines a virtual axis, the second moving track is defined by a user gesture and defines a direction, and the icons are repositioned about the first moving track in a direction determined by the direction of the second moving track, wherein the icons are repositioned about the first moving track by a mirror-image reversal of icons about the first moving track.

2. The method as claimed in claim 1, wherein the data element is used to execute an instruction, to activate an application program, to open a folder, to open a file or link to a URL.

3. The method as claimed in claim 1, wherein when the processor changes the coordinates of the icons of the operating system, the processor further changes sizes of the icons and the display device displays the icons according the sizes and the updated coordinates.

4. An electronic device capable of changing coordinates of icons according to a sensing signal and a trigger signal, the device comprising:
    a trigger signal generator to be enabled when a first moving track conforms to a predetermined condition or rule and to output a trigger signal when the first moving track and a second moving track match one of the trigger signal generation conditions, wherein the second moving track is generated after the first moving track;
    a display device to display a plurality of the icons of an operating system, wherein each icon corresponds to a data element; and
    an icon arrangement module activated when the first moving track conforms to a predetermined condition to rearrange the icons according to the first moving track and the second moving track when receiving the trigger signal, and an icon rearranged result is displayed on the display device,
    wherein the first moving track is defined by a user gesture and defines a virtual axis, the second moving track is defined by a user gesture and defines a direction, and the icons are repositioned about the first moving track in a direction determined by the direction of the second moving track, wherein the icons are repositioned about the first moving track by a mirror-image reversal of icons about the first moving track.

5. The device as claimed in claim 4, wherein the data element is used to execute an instruction, to activate an application program, to open a folder, to open a file or link to a URL.

6. The method as claimed in claim 1, wherein the icon shown in the window can be zoomed in to or zoomed out off according to a tilt angle of the portable device.

* * * * *